US010230695B2

(12) United States Patent
Cline et al.

(10) Patent No.: US 10,230,695 B2
(45) Date of Patent: Mar. 12, 2019

(54) DISTRIBUTION OF SECURE DATA WITH ENTITLEMENT ENFORCEMENT

(71) Applicant: Red Hat, Inc., Raleigh, NC (US)

(72) Inventors: Jeremy Cline, Raleigh, NC (US); Brian Bouterse, Raleigh, NC (US); Randall Barlow, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 229 days.

(21) Appl. No.: 15/403,791

(22) Filed: Jan. 11, 2017

(65) Prior Publication Data
US 2018/0198762 A1   Jul. 12, 2018

(51) Int. Cl.
*H04L 29/06* (2006.01)

(52) U.S. Cl.
CPC ...... *H04L 63/0428* (2013.01); *H04L 63/0281* (2013.01); *H04L 63/083* (2013.01); *H04L 63/166* (2013.01)

(58) Field of Classification Search
CPC ................................... H04L 63/0482
USPC ............................................ 726/12
See application file for complete search history.

(56) References Cited

U.S. PATENT DOCUMENTS

| | | |
|---|---|---|
| 7,137,143 B2 | 11/2006 | Chawla et al. |
| 8,700,728 B2 | 4/2014 | Luna et al. |
| 9,166,862 B1 | 10/2015 | Davis et al. |
| 9,330,196 B2 | 5/2016 | Luna |
| 9,390,052 B1 | 7/2016 | Parakh et al. |
| 2016/0066021 A1* | 3/2016 | Thomas .............. H04N 21/4312 725/14 |

OTHER PUBLICATIONS

*Does a TLS Interception Proxy Present the user's Browser with the End Server's Certificate?*, http://security.stackexchange.com/questions/49509/does-a-tls-interception-proxy-present-the-users-browser-with-the-end-servers-c.

*Fusion Middleware Administrator's Guide for Oracle Entitlements Server—1 Introducing Oracle Entitlements Server*, https://docs.oracle.com/cd/E27559_01/admin.1112/e27153/intro.htm#ESADR203.

*Is it Possible for Corporation to Intercept and Decrypt SSL/TLS Traffic?* [Duplicate] http://security.stackexchange.com/questions/101721/is-it-possible-for-corporation-to-intercept-and-decrypt-ssl-tls-traffic.

*What Effect does HTTPS Traffic have on Web Cache Proxy Servers?* http://serverfault.com/questions/654773/what-effect-does-https-traffic-have-on-web-cache-proxy-servers.

\* cited by examiner

*Primary Examiner* — Longbit Chai
(74) *Attorney, Agent, or Firm* — Haynes and Boone, LLP

(57) ABSTRACT

An example method for distributing content includes receiving a first encrypted request for content over a first encrypted connection from a client. The method also includes obtaining an unencrypted version of the first encrypted request. The unencrypted version is associated with authentication information associated with the client. The method further includes sending over a second encrypted connection entitlement data and a second encrypted request for the content to a repository. The repository stores the content, the entitlement data is based on the authentication information, and an authentication of the second encrypted request is based on the entitlement data. The method also includes downloading the content from the repository over the second encrypted connection, storing the requested content in unencrypted form in a cache, and streaming the requested content to the client.

20 Claims, 7 Drawing Sheets

DISTRIBUTION OF SECURE DATA WITH ENTITLEMENT ENFORCEMENT

FIELD OF DISCLOSURE

The present disclosure generally relates to data transfer and more specifically to caching and distributing secure content.

BACKGROUND

A web server may host one or more web applications. A client may send a request for content to a web application. In some examples, a proxy server sits between the client and web server and mediates interactions between them. If the client sends a request to the web server, the request may be sent to the proxy server, which may retrieve the data requested by the client from the web server. As such, the proxy server may access the web server on behalf of the client. In doing so, the proxy server may enable caching, filtering, and a sense of security for the clients on the network.

In response to the request, the web server may send the response to the proxy server, which may repackage the response and forward it to the client. The proxy server may cache the content received from the web server such that the next time the same or different client requests the content, the proxy server may retrieve the cached content and send it to the requesting client.

BRIEF SUMMARY

Methods, systems, and techniques for distributing secure content to one or more clients are provided. An example method for distributing content received over an encrypted connection to one or more clients includes receiving a first encrypted request for content over a first encrypted connection. The first encrypted request is from a client. The method also includes obtaining an unencrypted version of the first encrypted request. The unencrypted version is associated with authentication information associated with the client. The method further includes sending over a second encrypted connection entitlement data and a second encrypted request for the content to a repository. The repository stores the content, the entitlement data is based on the authentication information, and an authentication of the second encrypted request is based on the entitlement data. The method also includes downloading the content from the repository over the second encrypted connection. The method further includes storing the requested content in unencrypted form in a cache and streaming the requested content to the client.

An example system for distributing content received over an encrypted connection to one or more clients includes a reverse proxy that authenticates one or more encrypted requests from one or more clients received over one or more encrypted connections. The reverse proxy unencrypts one or more authenticated encrypted requests and sends the one or more unencrypted requests over a first connection different from the one or more encrypted connections. The system also includes a caching proxy that receives an unencrypted request for content over the first connection and sends authentication information and a second request for the content over a second connection different from the one or more encrypted connections. The system further includes a content streamer that receives the authentication information and the second request over the second connection, retrieves, based on the authentication information, entitlement data from an entitlement database, and sends the entitlement data and an encrypted request for the content over an encrypted connection to a repository storing the content. An authentication of the encrypted request is based on the entitlement data. The content streamer downloads the content from the repository over the encrypted connection if the encrypted request is authenticated. The caching proxy receives the requested content, caches the requested content in unencrypted form, and streams the requested content to the reverse proxy. The reverse proxy streams the content to the client.

An example machine-readable medium includes a plurality of machine-readable instructions that when executed by one or more processors is adapted to cause the one or more processors to perform a method including: receiving a first encrypted request for content over a first encrypted connection, the first encrypted request from a client; obtaining an unencrypted version of the first encrypted request, the unencrypted version associated with authentication information associated with the client; sending over a second encrypted connection entitlement data and a second encrypted request for the content to a repository, the repository storing the content, the entitlement data being based on the authentication information, and an authentication of the second encrypted request being based on the entitlement data; downloading the content from the repository over the second encrypted connection; storing the requested content in unencrypted form in a cache; and streaming the requested content to the client.

Figure 1:
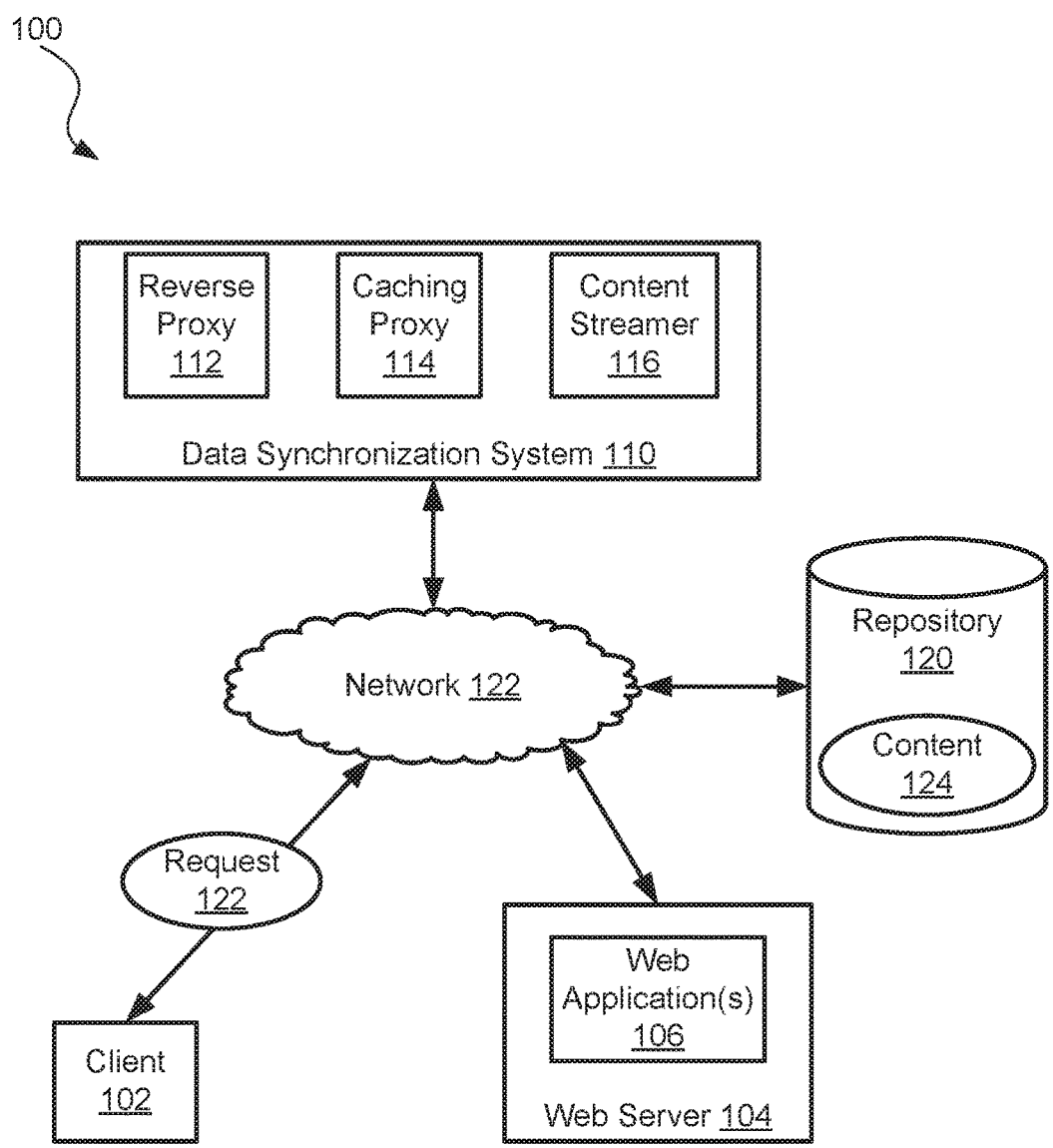
FIG. 1 depicts an example communication system for distributing secure content to one or more clients in accordance with one or more aspects of the present disclosure.

Examples of the present disclosure and their advantages are best understood by referring to the detailed description that follows.

I. Overview
II. Example System Architecture
  A. Client Sends a Request for Content over an Encrypted Connection
  B. Reverse Proxy Authenticates Client Requests
  C. Caching Proxy Processes Authenticated Requests
    1. Caching Proxy Caches Authenticated Requests in Unencrypted Form
    2. Caching Proxy Deduplicates Authenticated Requests
  D. Content Streamer Retrieves Requested Content
III. Example Sequence Diagram
IV. Example Method
V. Example System Diagram
VI. Distribution of Cached Content

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

I. Overview

A proxy server may mediate interactions between a client and a web server. In doing so, the proxy server may enable caching, filtering, and a sense of security for the clients on the network. If a client sends a request for content through the proxy server and connects to the proxy server using an encrypted connection, the proxy server receives an encrypted request from the client. The proxy server may be unable to cache this content because the proxy server is unable to inspect and make sense of the content. Typically, a proxy server is not used if encryption is involved because the proxy server is unable to examine the content accessed by the client. Accordingly, the proxy server may be unable to cache the encrypted data for delivery to another client at a later point in time. A proxy server may be ineffective when dealing with secure content. The problem lies in identification of repeated information. Secure content passing through these appliances is encrypted using a key known only to the end points, namely the web server and the web browser. Each web browser connected to the proxy cache passes through information that is unrecognizable to the proxy cache. The proxy cache cannot interpret the data to determine if the data should be stored or if the data request matches any stored data. Hence it is useless to cache the encrypted information. Consequently, the existing infrastructure designed to make the Internet more efficient and faster becomes ineffective when dealing with secure content. If the proxy server terminates the encrypted connection, then the authentication information that was originally sent by the client to authenticate to the web server may be lost. Additionally, if the proxy server does not terminate the encrypted connection, then the proxy server may be unable to deduplicate the requests from multiple clients requesting the same content.

This problem caching and distributing secure content may be solved by allowing the client to connect to a reverse proxy that terminates the end-to-end encrypted connection between the client and reverse proxy and allowing the reverse proxy to establish a separate connection to the caching proxy for continued processing of the request. In an example, the reverse proxy decrypts the encrypted request and sends the unencrypted request to a caching proxy for caching of the request in unencrypted form. The caching proxy may cache the request because it is no longer encrypted. The caching proxy may forward the request for the content to a content streamer that forms encrypted connections with the content sources. The content streamer may send an encrypted request for the content to the repository. After successfully authenticating the encrypted request, the content streamer receives the content in encrypted form from the repository. The content streamer may decrypt the encrypted content and provide caching proxy with the content in unencrypted form. The caching proxy may cache the content because it is no longer encrypted. Accordingly, the caching proxy may store both the request for content and the actual content in unencrypted form, thus knowing if the cached content satisfies future requests. Additionally, as will be explained in further detail, the content streamer may download the content once and distribute it to multiple clients.

The present disclosure provides techniques for distributing secure content. Unless specifically stated otherwise, as apparent from the following discussion, it is appreciated that throughout the description, discussions utilizing terms such as "determining," "receiving," "sending," "receiving," "obtaining," "downloading," "providing," "storing," "identifying," "streaming," "authenticating," "discarding," "unencrypting," "establishing," "retrieving," "multiplexing," "deduplicating," "terminating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

FIG. 1 depicts an example system 100 for distributing secure content to one or more clients in accordance with one or more aspects of the present disclosure. Secure content refers to content received over an encrypted connection. An encrypted connection is a connection that is encrypted by one or more security protocols to ensure the security of data flowing between two or more nodes. Data flowing through the encrypted connection is encrypted from the sender node to the receiver node.

A client 102, web server 104, data synchronization system 110, and repository 120 are coupled to a network 122. Network 122 may be a private network (e.g., local area network (LAN), wide area network (WAN), intranet, etc.), a public network (e.g., the Internet), or a combination thereof. The network may include various configurations and use various protocols including virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi, Hypertext Transfer Protocol (HTTP), HTTP Secure (HTTPS), and various combinations of the foregoing. HTTPS is a combination of the HTTP with the Secure Socket Layer (SSL)/Transport Layer Security (TLS) protocol.

A. Client Sends a Request for Content Over an Encrypted Connection

Web server 104 hosts one or more web applications 106. Client 102 and web server 104 may establish an encrypted connection (e.g., TLS connection), and the client may send a request 122 for content 124 over the encrypted connection to web application 106. Although one client is illustrated in system 100, multiple clients may establish encrypted connections with and sends requests to web server 104. Content 124 may be content that is fetched by multiple clients interacting with web application 106. In an example, content 124 is a version of a web browser, an application, or a software patch.

Repository 120 may be configured to receive requests for content over an encrypted connection. Accordingly, a client (e.g., client 102 or a caching proxy) desiring to access content stored in repository 120 performs actions to establish an encrypted connection with repository 120 and accesses the content over encryption. Such a configuration provides authentication at both endpoints of the encrypted connection so that the client is confident it is communicating with repository 120 and also that repository 120 is confident it is communicating with the client. Additionally, the encrypted connection may make it more difficult for clients to access unauthorized content from repository 120.

Figure 2:
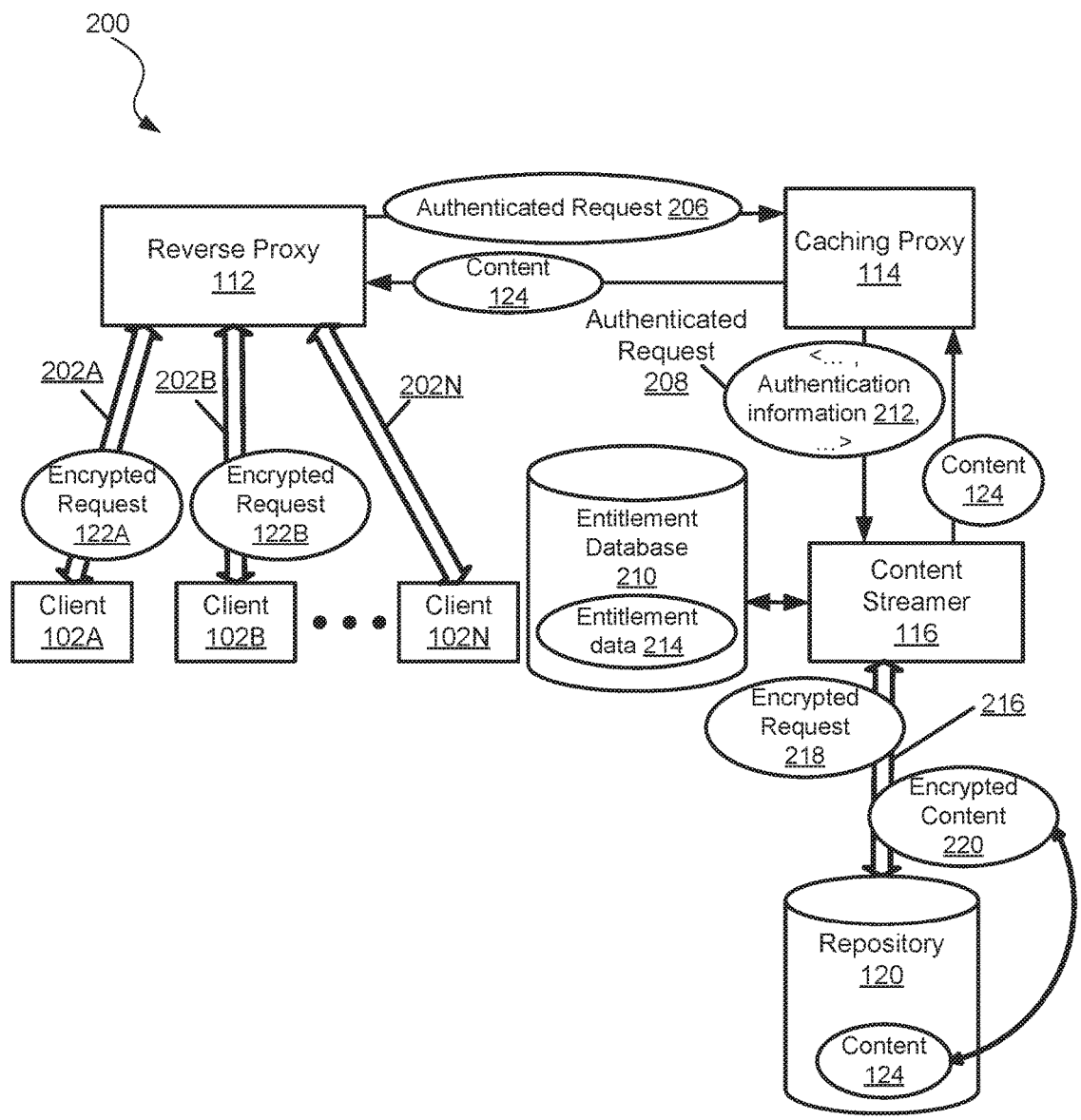
FIG. 2 depicts an example block diagram for caching and distributing secure content to one or more clients in accordance with one or more aspects of the present disclosure.

To enable the caching and distribution of secure content in a network system, system 100 includes data synchronization system 110, which is described in greater detail below in connection with FIG. 2. Data synchronization system 110 includes a reverse proxy 112, caching proxy 114, and content streamer 116. A request for content from client 102 to web server 104 may flow from reverse proxy 112 to caching proxy 114 and then to content streamer 116 and finally to the repository that stores the content. In some examples, caching proxy 114 is an onsite caching proxy located at an edge of the client's network. FIGS. 1 and 2 will be discussed in relation to each other to better understand some features of the disclosure. FIG. 2 depicts an example block diagram 200 for caching and distributing secure content to one or more clients in accordance with one or more aspects of the present disclosure.

Client 102 may send request 122 to web application 106 hosted by web server 104, where request 122 is a request for content 124. Web server 104 may redirect client 102 to data synchronization system 110 for retrieval of the requested content. In doing so, data synchronization system 110 may perform actions to cache content 124 and distribute it to the client 102 along with other clients requesting the same content. In an example, in response to request 122, web server 104 returns an HTTP response including a 302 code, which indicates a redirection, and a Location header to client 102. Client 102 requests the new uniform resource identifier (URI) specified by the Location header. In an example, web server 104 redirects the client to reverse proxy 112, and reverse proxy 112 and the client perform actions to establish an encrypted connection through which encrypted content flows. One or more clients that send a request to web application 106 may be redirected to reverse proxy 112 by web server 104. In the example illustrated in FIG. 2, reverse proxy 112 and multiple clients 102A, 102B, . . . , 102N may perform actions to establish encrypted connections 202A, 202B, . . . , 202N, respectively.

In an example, encrypted connections 202A, 202B, . . . , 202N are TLS connections. TLS is an authentication and security protocol that may be implemented in browsers and web servers. The TLS protocol is one of the most widely deployed protocols for securing communications on the World Wide Web. TLS guarantees privacy and authenticity of information exchanged between two endpoints (e.g., a web server and a web browser). A TLS session between a web server and a web browser occurs in a number of phases. When a web browser first connects to a web server using TLS, the browser and server execute the TLS handshake protocol. The outcome of this protocol is a session encryption key and a session integrity key. These keys are known only to the web server and the web browser. Once the session keys are established, the browser and server begin exchanging data. The data is encrypted using the session encryption key and protected from tampering using the session integrity key. When the browser and server are done exchanging data the connection between them is terminated. If the browser and server subsequently reestablish a secure connection, the browser and server may execute a resume handshake or establish a new set of session keys. A resume handshake protocol causes both server and browser to reuse the session key previously established during the initial handshake, and is more efficient, but requires the connection between the web server and web browser to be continuous. Thereafter, all application data is encrypted and protected using the previously established session keys. Although the examples may describe the encrypted connections as being TLS connections, it should be understood that this is not intended to be limiting and additional and/or other security protocols may be used.

Data synchronization system 110 has an inbound connection layer and an outbound connection layer. Encrypted connections may be terminated at the inbound connections, while data synchronization system 110 continues to send requests to and receive responses from resource sources over an encrypted connection using proper authentication (e.g., TLS client certificates over a TLS connection). The inbound connection layer may include connections between requesting clients 102 and reverse proxy 112, and the outbound connection layer may include connections between content streamer 116 and sources storing the requested content. It should be understood that each of reverse proxy 112, caching proxy 114, and content streamer 116 may reside on the same host as each other or different hosts. Both of these scenarios are discussed further below.

To respond to client requests and to ensure the caching and security of the requested content, the inbound connection between client 102 and reverse proxy 112 may be terminated and a new connection established between reverse proxy 112 and caching proxy 114 to continue processing of request 122A. Despite the connection termination at the inbound connection layer, content streamer 116 may continue to establish new encrypted connections with sources (e.g., repository 120) to retrieve the requested content. Accordingly, to complete a client request and thus retrieve the content requested by the client, encrypted connection 202A may be established and terminated in the inbound connection layer and a separate encrypted connection 216 may be established in the outbound connection layer to the one or more content sources storing the requested content. Although the examples may discuss encrypted connection 202A and client 102A, it should be understood that the examples apply to encrypted connections 202B, . . . , and/or 202N and to clients 102B, . . . , 102N.

B. Reverse Proxy Authenticates Client Requests

Reverse proxy 112 may be the "gatekeeper" that allows client requests to be discarded or forwarded to caching proxy 114 for further processing. In order for data synchronization system 110 to process a client's request for content, each client authenticates itself to reverse proxy 112. In the present disclosure, authentication of a client may also refer to authentication of a request sent by the client. Additionally, a client that is successfully authenticated may also refer to the client's request being successfully authenticated. Likewise, a client that fails authentication may also refer to the client's request failing authentication.

Reverse proxy 112 enforces entitlement by determining whether a client is authorized to access the requested content. Reverse proxy 112 protects content stored in a source repository from being distributed to unauthorized clients. In an example, a client that is not successfully authenticated is not authorized to access the requested content, and thus reverse proxy 112 does not forward the client's request to caching proxy 114 for further processing. In this example, the client has failed authentication, and reverse proxy 112 may send an error message and an authentication credentials request to the client to authenticate the client again.

In another example, a client that is successfully authenticated is authorized to access the requested content. If reverse proxy 112 successfully authenticates client 102A, reverse proxy 112 decrypts the client's request 122A, generates an authenticated request 206 based on request 122A, and sends authenticated request 206 to caching proxy 114. In an example, caching proxy 114 generates authenticated request 206 by decrypting request 122A, and authenticated request 206 is the decrypted version of request 122A. A decrypted request may also be referred to as an unencrypted request. In an example, authenticated request 206 is the encrypted request sent though encrypted connection 202A in plain text. It should be understood that reverse proxy 112 may authenticate multiple clients and may thus send multiple authenticated requests to caching proxy 114. Reverse proxy 112 ensures that requests sent to caching proxy 114 for the same content look the same. For example, decrypted versions of each encrypted request for the same content look the same. In this way, caching proxy 114 is able to determine whether a request for particular content has already been received and also whether the content is already stored in the cache. In an example, reverse proxy 112 may map multiple client requests to a single request sent to caching proxy 114. In this example, the effect of having reverse proxy 112 map multiple client requests to a single request sent to caching proxy 114 may cause the effect of remote content (e.g., content stored in repository 120) only being fetched once.

Client 102A may send authentication information to reverse proxy 112. In an example, client 102A includes the authentication information in encrypted request 122A. In another example, client 102A sends authentication information and encrypted 122A separately. The authentication information used to authenticate client 102A is associated with the client and is used to determine whether this client is authorized to access the requested content.

Reverse proxy 112 may use various techniques to authenticate client 102A. In keeping with the above example in which web server 104 returns the HTTP response with the 302 code, web server 104 may sign the URL that references the client's requested content and embed the signed URL in the HTTP response returned to the client. Web server 104 may sign the URL cryptographically so that it cannot be forged. In this example, reverse proxy 112 may authenticate the client by validating the signature embedded in the URL and checking it against a timestamp to ensure that the URL is still valid. If the URL signature matches an expected signature and the URL is still valid, the client is successfully authenticated. In this example, reverse proxy 112 may strip the signature and timestamp from the URL and forward the request to caching proxy 114 via a plaintext request. If the URL signature does not match the expected signature or the URL is not valid, the client fails authentication and is not successfully authenticated.

In another example, client 102A sends an authentication request including credentials to reverse proxy 112. The credentials may include, for example, a username and password. Reverse proxy 112 may search an authentication database (not shown) for the username and password. If the username and password are stored in the authentication database, the client is successfully authenticated. If not, the client is not successfully authenticated. In another example, client 102A sends a digital certificate signed by a certificate-issuing authority to reverse proxy 112, which verifies the certificate. It should be understood that reverse proxy 112 may implement different or additional techniques from those discussed to authenticate client 102A.

Additionally, authenticated request 206 may be unencrypted or encrypted. For example, if reverse proxy 112 and caching proxy 114 reside on different hosts, the connection between them may be encrypted. In this example, encrypted connection 202A between client 102A and reverse proxy 112 may be established and terminated, and reverse proxy 112 and caching proxy 114 may establish a new encrypted connection between each other. For example, communication between client 102A and reverse proxy 112 is associated with a first TLS session and communication between reverse proxy 112 and caching proxy 114 are associated with a second TLS session. In this example, the first TLS session is different and separate from the second TLS session. In particular, the first and second TLS sessions are independent sessions with different session keys.

Reverse proxy 112 may decrypt request 122A with the session key corresponding to encrypted connection 202A, generate authenticated request 206 by re-encrypting the decrypted request with the session key corresponding to the new encrypted connection between reverse proxy 112 and caching proxy 114, and send this re-encrypted request (e.g., authenticated request 206) to caching proxy 114. Because reverse proxy 112 and caching proxy 114 established a separate encrypted connection independent from encrypted connection 202A, caching proxy 114 knows the encryption keys and can therefore decrypt whatever it receives from reverse proxy 112 (e.g., an encrypted authenticated request) and may thus cache that decrypted information. Additionally, if reverse proxy 112 and caching proxy 114 are on the same host, the connection between them may be unencrypted or encrypted.

Caching proxy 114 is able to cache content received from reverse proxy 112 as long as encrypted connection 202 is not a pass-through encrypted connection that runs through caching proxy 114 such that caching proxy 114 is unable to inspect and understand the content from reverse proxy 112. Instead, encrypted connection 202A may be an end-to-end connection between client 102A and reverse proxy 112 and eventually terminated, and a new encrypted connection may be established between reverse proxy 112 and caching proxy 114.

C. Caching Proxy Processes Authenticated Requests

1. Caching Proxy Caches Authenticated Requests in Unencrypted Form

Caching proxy 114 receives authenticated request 206 and is able to inspect the request because it is either no longer encrypted or caching proxy 114 has the ability to decrypt the request. Caching proxy 114 caches the decrypted authenticated request. Accordingly, caching proxy 114 can recognize if content 124 is requested by any clients at a later point in time. Caching proxy 114 may determine a status of authenticated request 206 by inspecting it. If authenticated request 206 is already stored in the cache, then the request has been previously fulfilled and content 124 is stored in caching proxy 114. Authenticated request 206 is already stored in the cache if it matches a request that is already stored in caching proxy 114. A request matches another request if they are requests for the same content. In response to a determination that authenticated request 206 is already stored in the cache, caching proxy 114 retrieves content 124 from the cache and returns the cached content 124 to reverse proxy 112, which returns content 124 to the requesting client.

If authenticated request 206 is stored in an in-progress queue, then the request is in the process of being sent to a client. In response to a determination that authenticated request 206 is stored in the in-progress queue, data synchronization system 110 multiplexes the existing stream of bits of content 124 with the request from client 102A, such that the group of clients requesting content 124 receive it in parallel while data synchronization system 110 downloads content 124 once from repository 120. In an example, in response to receiving authenticated request 206, caching proxy 114 places the request in the in-progress queue. While the request is in the in-progress queue, it is being processed by data synchronization system 110. After the requested content has been sent to all clients that have requested content 124, the request is complete and caching proxy 114 may remove the request from the in-progress queue. If the request is successfully executed, caching proxy 114 has cached content 124 along with the decrypted version of authenticated request 206.

If authenticated request 206 is not stored in the cache and is also not stored in the in-progress queue, caching proxy 114 sends an authenticated request 208 to content streamer 116. Authenticated request 208 is based on authenticated request 206. In an example, authenticated request 206 is the same as authenticated request 208. In this example, caching proxy 114 forwards the authenticated request received from reverse proxy 112 to content streamer 116. In another example, caching proxy 114 modifies authenticated request 206 and forwards this modified authenticated request 208 to content streamer 116. In this example, caching proxy 114 may generate authenticated request 208 by adding, removing, or modifying information in authenticated request 206. Authenticated request 208 includes authentication information 212, which is used by content streamer 116 to determine the appropriate entitlement data to provide to the source repository for authentication of request 208.

2. Caching Proxy Deduplicates Authenticated Requests

Caching proxy 114 may receive multiple authenticated requests from reverse proxy 112. The multiple authenticated requests may be from multiple clients requesting the same and/or different content. If reverse proxy 112 receives request 122A from client 102A and a request 122B from client 102B and they are requests for the same content, the authenticated requests associated with request 122A and request 122B and passed from reverse proxy 112 to caching proxy 114 are the same. In an example, authenticated request 206 is the decrypted version of request 122A and request 122B, and thus the authenticated requests corresponding to requests 122A and 122B match. A request matches another request if they are requests for the same content. It may be desirable for caching proxy 114 to deduplicate many requests, allowing for quick delivery of content and reduction of bandwidth and time for the benefit of clients.

Figure 3:
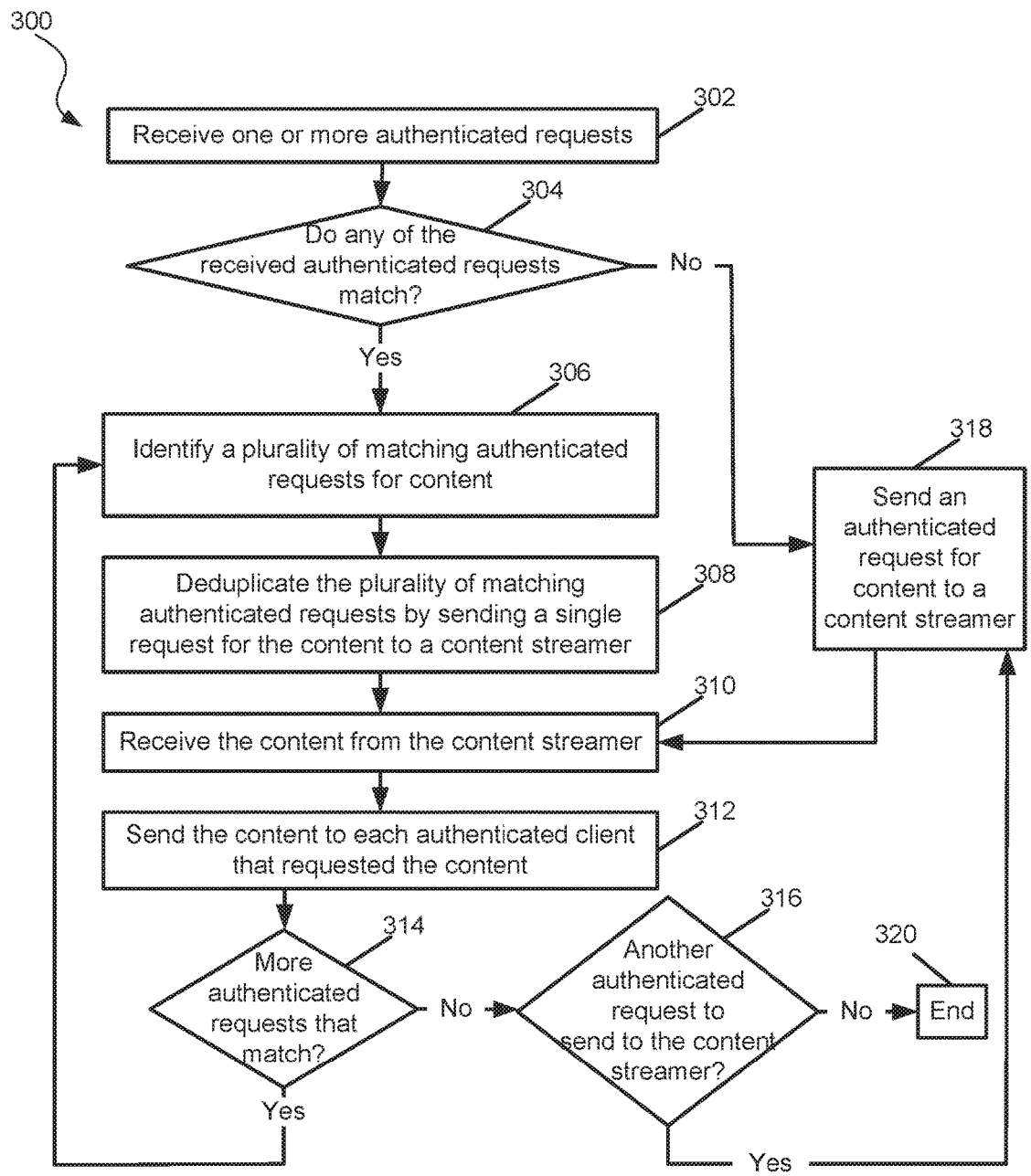
FIG. 3 is a flowchart illustrating an example method for deduplicating authenticated requests and retrieving content in accordance with one or more aspects of the present disclosure.

FIG. 3 is a flowchart illustrating an example method 300 for deduplicating authenticated requests and retrieving content in accordance with one or more aspects of the present disclosure. Method 300 is not meant to be limiting and may be used in other applications. In FIG. 3, method 300 includes blocks 302-320. In block 302, caching proxy 114 receives one or more authenticated requests from reverse proxy 112. In block 304, caching proxy 114 determines whether any of the received authenticated requests match. An authenticated request matches another authenticated request if they are requests for the same content.

If any of the authenticated requests match, process flow proceeds from block 304 to block 306, in which caching proxy 114 identifies a plurality of matching authenticated requests for content. In block 308, caching proxy 114 deduplicates the plurality of matching authenticated requests by sending a single request for the content to content streamer 116. Accordingly, although multiple clients may send requests for the same content to data synchronization system 110, caching proxy 114 sends only one of these requests to content streamer 116 for processing. Doing so allows content 124 to be received once by content streamer 116, which may be advantageous in terms of reducing bandwidth and time consumed.

In block 310, caching proxy 114 receives content 124 from content streamer 116. In block 312, caching proxy 114 sends content 124 to each authenticated client that requested content 124 and has not yet had its request satisfied. In an example, content streamer 116 streams content 124 to caching proxy 114, and caching proxy 114 streams the content to each authenticated client that requested content 124 and has not yet had its request satisfied. In this example, content streamer 116 does not wait until it receives all of content 124 before sending it to caching proxy 114. Rather, content streamer 116 may stream bytes of content 124 to caching proxy 114 as content streamer 116 is receiving the bytes of content 124 from repository 120. Caching proxy 114 may receive the streamed bytes from content streamer 116, while streaming bytes of content 124 to reverse proxy 112. Additionally, reverse proxy 112 may receive the streamed bytes from caching proxy 114, while streaming bytes of content 124 to one or more clients. By streaming content 124, time may be saved, especially if content 124 is a large file. Additionally, it may be unnecessary for content streamer 116 and/or reverse proxy 112 to have enough random access memory (RAM) to store content 124. Accordingly, content streamer 116 and reverse proxy 112 may be lean and not heavy on memory storage. Caching proxy 114 may send content 124 to a client by sending content 124 to reverse proxy 112, which sends content 124 to the client.

In block 314, caching proxy 114 determines whether there are more authenticated requests that match. If so, process flow proceeds from block 314 to block 306, in which caching proxy 114 identifies another plurality of matching authenticated requests for content. If not, process flow proceeds from block 314 to block 316, in which caching proxy 114 determines whether there is another authenticated request to send to content streamer 116. If so, process flow proceeds from block 316 to block 318, in which caching proxy 114 sends another authenticated request for content to content streamer 116. Process flow proceeds from block 318 to block 310. In not, process flow proceeds from block 316 to end 320.

If none of the authenticated requests match, process flow proceeds from block 304 to block 318, in which caching proxy 114 sends an authenticated request for content 124 to content streamer 116. Process flow proceeds from block 318 to block 310.

In some examples, one or more actions illustrated in blocks 302-320 may be performed for any number of authenticated requests received by caching proxy 114. It is also understood that one or more of the blocks of method 300 described herein may be omitted, combined, or performed in a different sequence as desired. Additionally, it is also understood that additional processes may be inserted before, during, or after blocks 302-320 discussed above. For example, after caching proxy 114 sends an authenticated request to content streamer 116, caching proxy 114 may insert the sent authenticated request into an in-progress queue. Caching proxy 114 may remove the authenticated request from the in-progress queue after data synchronization system 110 has delivered the content requested in the authenticated request to each authenticated client that requested it but has not yet received it. In this example, reverse proxy 112 and/or caching proxy 114 may determine that the authenticated request is in the in-progress queue, and process flow may proceed to block 312, in which the content requested in the authenticated request is streamed to the requesting client. If the authenticated request is not in the in-progress queue, process flow may proceed to block 304.

D. Content Streamer Retrieves Requested Content

Referring back to FIG. 2, content streamer 116 receives authenticated request 208, which may be a deduplicated authenticated request as discussed in FIG. 3, from caching proxy 114. Content streamer 116 makes outbound encrypted connections to source repositories that store requested content. Content streamer 116 receives authenticated request 208 and determines how and where to access the requested content. In keeping with the above example, the content requested in authenticated request 208 is content 124. Content streamer 116 inspects authenticated request 208 to determine where requested content 124 is stored. In some examples, authentication information 212 is included in unencrypted request 122A and authenticated request 206. In an example, authenticated request 208 includes the URL that references content 124, and content streamer 116 determines that repository 120 stores content 124 based on the URL.

Content streamer 116 accesses an entitlement database 210 that stores entitlement data for authenticating the request to repository 120. Entitlement database 210 may store entitlement data associated with multiple clients and repositories. Entitlement data is data that authenticates a client request to a repository storing the requested content. Content streamer 116 uses authentication information 212 included in authenticated request 208 to determine which entitlement data stored in entitlement database 210 to use for authentication purposes to repository 120. Entitlement data may be specific to the client requesting the content such that repository 120 is able to determine whether the client is authorized to access such content.

In FIG. 2, content streamer 116 uses authentication information 212 to identify entitlement data 214 stored in entitlement database 210. Content streamer 116 may implement various techniques to determine how and where to access content 124. In an example, authentication information 212 is a key that references entitlement data 214 and that is associated with client 102A. In this example, content streamer 116 may determine that entitlement data 214 is the correct authentication information to authenticate authenticated request 208 to repository 120. In an example, encrypted connection 216 is a TLS connection, and entitlement data 214 is a TLS certificate that allows content streamer 116 to authenticate authenticated request 208 to repository 120. In another example, entitlement data 214 is a username and password that allows content streamer 116 to authenticate authenticated request 208 to repository 120.

In an example, content streamer 116 uses the URL included in request 122A, authenticated request 206, and authenticated request 208 to determine where the content is stored and the appropriate credentials and network settings for accessing content 124. Content streamer 116 may do this by using a catalog that maps the URLs that will be requested by clients to URLs on the Internet and download configurations for those URLs. These downloaded configurations may include, for example, certificate authorities, client certificates and keys, and username/passwords pairs.

Content streamer 116 and repository 120 establish an end-to-end encrypted connection 216. After content streamer 116 has determined where and how to access content 124, content streamer 116 sends an encrypted request 218 for content 124 to repository 120. Content streamer 116 uses entitlement data 214 to form encrypted request 218. Encrypted request 218 may include entitlement data 214. Repository 120 enforces entitlement by determining whether client 102A is authorized to access the requested content. Repository 120 protects content stored in the repository from being distributed to unauthorized clients. If repository 120 authenticates encrypted request 218, repository 120 retrieves the requested content 124 and generates encrypted content 220 by encrypting the content 124. Repository 120 sends encrypted content 220 to content streamer 116 over encrypted connection 216, where encrypted content 220 is the encrypted version of content 124. Content streamer 116 downloads encrypted content 220 over encrypted connection 216 (e.g., a TLS-encrypted connection).

Content streamer 116 decrypts encrypted content 220 to generate content 124 and streams content 124 back to caching proxy 114. The requested content that is sent from content streamer 116 to caching proxy 114 may be unencrypted or encrypted. For example, if caching proxy 114 and content streamer 116 reside on different hosts, the connection between them may be encrypted. In this example, encrypted connection 202A between client 102A and reverse proxy 112 may be established and terminated, and caching proxy 114 and content streamer 116 may establish a new encrypted connection between each other. For example, communication between client 102A and reverse proxy 112 is associated with a first TLS session and communication between caching proxy 114 and content streamer 116 are associated with a second TLS session. In this example, the first TLS session is different and separate from the second TLS session. In particular, the first and second TLS sessions are independent sessions with different session keys.

Caching proxy 114 may decrypt content received from content streamer 116 with the session key corresponding to this new encrypted connection. Because caching proxy 114 and content streamer 116 established a separate encrypted connection independent from encrypted connection 202A, caching proxy 114 knows the encryption keys and can therefore decrypt whatever it receives from content streamer 116 (e.g., encrypted content 220) and may thus cache that decrypted information. Additionally, if caching proxy 114 and content streamer 116 are on the same host, the connection between them may be unencrypted or encrypted.

Caching proxy 114 is able to cache content received from content streamer 116 as long as encrypted connection 202 is not a pass-through encrypted connection that runs through caching proxy 114 and content streamer 116 such that caching proxy 114 is unable to inspect and understand the content from content streamer 116. Instead, encrypted connection 202A may be an end-to-end connection between client 102A and reverse proxy 112 and eventually terminated, and a new encrypted connection may be established between caching proxy 114 and content streamer 116.

Caching proxy 114 receives the requested content from content streamer 116 and is able to inspect the content because it is either no longer encrypted or caching proxy 114 has the ability to decrypt the content. Caching proxy 114 caches content 124 so that caching proxy 114 can use it to satisfy other client requests for content 124 at a later point in time. By caching content 124, caching proxy 114 may skip the process of sending authenticated request 208 to content streamer 116 and repository 120 the next time content 124 is requested by a client. Caching proxy 114 sends content 124 to reverse proxy 112, which then sends it to the requesting client. In some examples, reverse proxy 112 sends content 124 over an encrypted connection to the requesting client. In an example, reverse proxy 112 and client 102A establish a new encrypted connection different from encrypted connection 202A, and reverse proxy 112 sends content 124 over this encrypted connection to the client. In this example, the session key associated with the new encrypted connection is different from the session key associated encrypted connection 202A. In another example, reverse proxy 112 sends content 124 over encrypted connection 202A and then this connection is terminated. In this example, reverse proxy 112 and client 102A may reestablish secure connection 202A and execute a resume handshake to reuse the session keys associated with encrypted connection 202A.

If client 102B sends request 122B to data synchronization system 110 before data synchronization system 110 has finished sending content 124 to client 102A, request 122B is still in the in-progress queue and reverse proxy 112 may proceed with multiplexing the existing stream of bytes of content 124 with the request from client 102A such that content 124 is streamed to both clients 102A and 102B. In this example, after reverse proxy 112 is finished streaming to both clients 102A and 102B, the request is removed from the in-progress queue. At this time, caching proxy 114 may store both the request and its requested content, both in unencrypted form.

Alternatively, if client 102B sends request 122B to data synchronization system 110 after data synchronization system 110 has finished sending content 124 to all authenticated clients, request 122B is no longer in the in-progress queue. In this example, reverse proxy 112 may send the authenticated request corresponding to request 122B to caching proxy 114, which may determine that the request is already stored in the cache. Caching proxy 114 may then retrieve the requested content 124 from the cache and send it to reverse proxy 112, which may then send it to client 102B (and any other clients that have requested content 124 in the meantime).

III. Example Sequence Diagram

Figure 4:
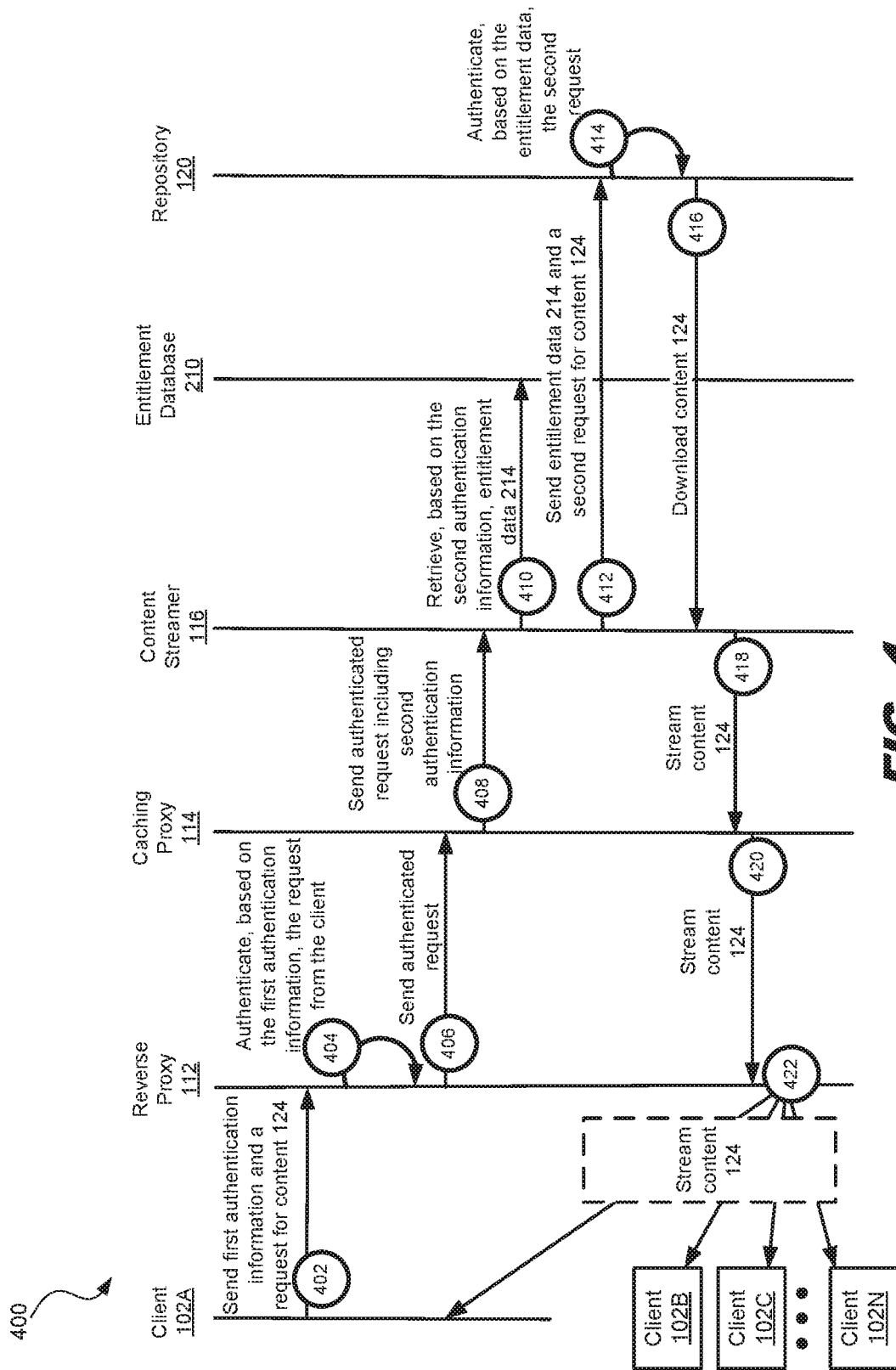
FIG. 4 is a sequence diagram for distributing secure content to one or more clients in accordance with one or more aspects of the present disclosure.

FIG. 4 is a sequence diagram 400 for distributing secure content to one or more clients in accordance with one or more aspects of the present disclosure. Diagram 400 is not meant to be limiting and may be used in other applications. In FIG. 4, at action 402, client 102 sends first authentication information and a request for content 124 to reverse proxy 112. A plurality of clients may send authentication information and a request for content (e.g., content 124 or other content) to reverse proxy 112. In an example, the authentication information sent by a client is associated with the client such that reverse proxy 112 is able to determine whether the client is authorized to access the requested content.

At action 404, reverse proxy 112 authenticates, based on the first authentication information, the request from the client. At action 406, reverse proxy 112 sends the authenticated request to caching proxy 114. At action 408, caching proxy 114 sends the authenticated request including second authentication information to content streamer 116. At action 410, content streamer 116 retrieves, based on the second authentication information, entitlement data 214. In an example, the second authentication information maps to entitlement data 214 in entitlement database 210. The first authentication information may be the same as or different from the second authentication information.

At action 412, content streamer 116 sends entitlement data 214 and a second request for content 124 to repository 120. In an example, content streamer 116 sends entitlement data 214 separate from the second request for content 124. In another example, content streamer 116 includes entitlement data 214 in the second request for content 124. At action 414, repository 120 authenticates, based on entitlement data 214, the second request. Repository 120 sends content 124 to content streamer 116. At action 416, content streamer 116 downloads content 124 from repository 120. Action 416 may occur once for multiple requests from clients for content 124. In this way, content streamer 116 may download content 124 once for eventual streaming to multiple clients. At action 418, content streamer 116 streams content 124 to caching proxy 114. At action 420, caching proxy 114 streams content 124 to reverse proxy 112. At action 422, reverse proxy 112 streams content 124 to one or more clients (e.g., client 102A, 102B, 102C, . . . , 102N) that have requested content 124. Reverse proxy 112 may stream content 124 to multiple clients by multiplexing content 124 and streaming it to the authenticated clients. In an example, reverse proxy 112 streams content 124 to the clients over an encrypted connection.

Actions 416, 418, 420, and/or 422 may overlap during a period of time. For example, while content streamer 116 is downloading content 124 from repository 120, content streamer 116 may stream bytes of content 124 to caching proxy 114, which may be simultaneously receive bytes of content 124 from content streamer 116 and stream bytes of content 124 to reverse proxy 112. Reverse proxy 112 may simultaneously receive bytes of content 124 from caching proxy 114 and stream bytes of content 124 to one or more authenticated clients. Accordingly, bytes of content 124 may flow through repository 120 to content streamer 116, caching proxy 114, reverse proxy 112, and to authenticated clients simultaneously.

In some examples, one or more actions 402-422 may be performed for any number of requests for content received. Additionally, it is also understood that additional processes may be inserted before, during, or after actions 402-422 discussed above. It is also understood that one or more of actions 402-422 described herein may be omitted, combined, or performed in a different sequence as desired.

IV. Example Method

Figure 5:
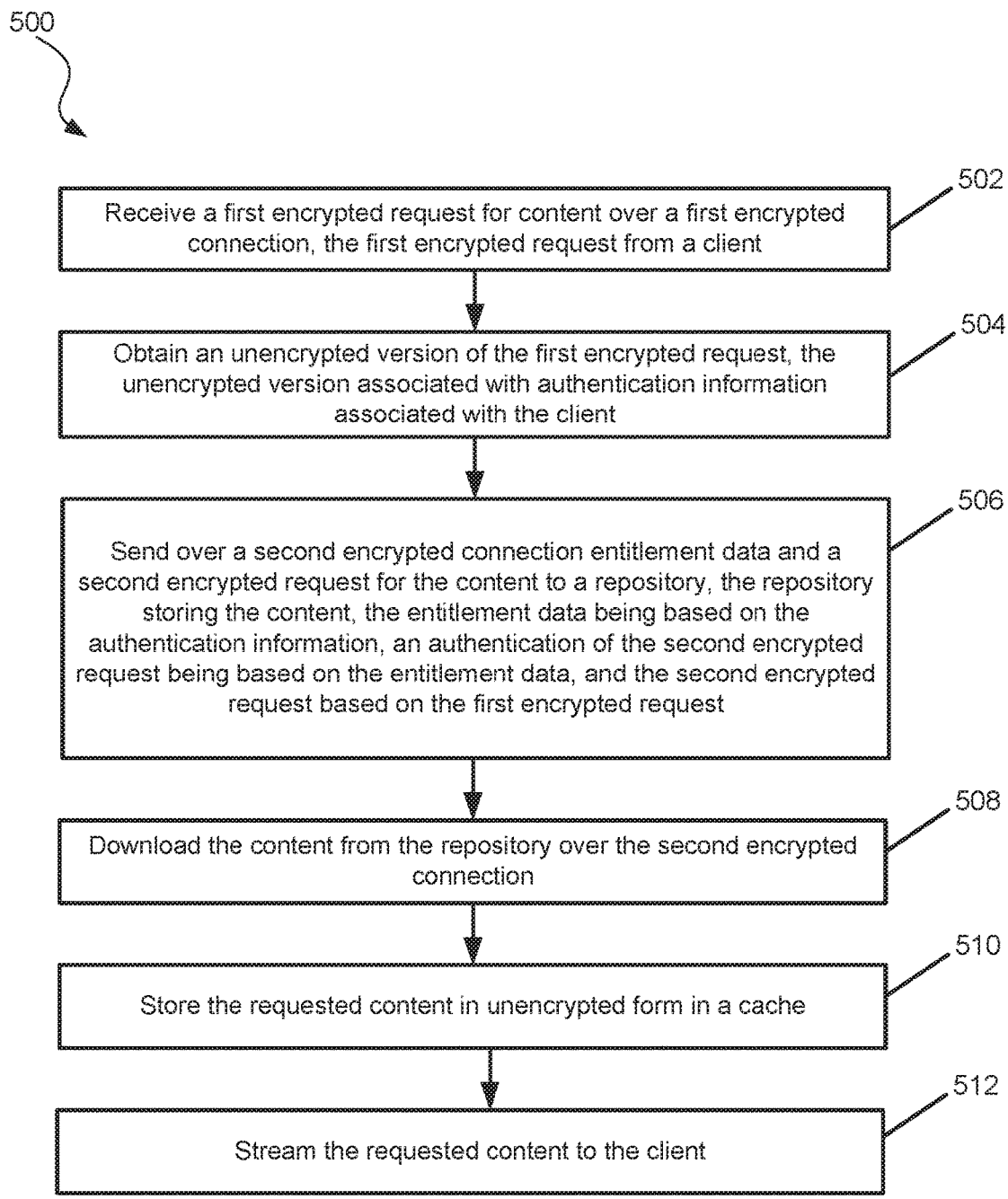
FIG. 5 is a flowchart illustrating an example method for distributing secure content to one or more clients in accordance with one or more aspects of the present disclosure.

FIG. 5 is a flowchart illustrating an example method 500 for distributing secure content to one or more clients in accordance with one or more aspects of the present disclosure. Method 500 is not meant to be limiting and may be used in other applications.

In FIG. 5, method 500 includes blocks 502-512. In block 302, reverse proxy 112 receives a first encrypted request for content 124 over a first encrypted connection 202A, the first encrypted request from client 102A. In block 504, caching proxy 114 obtains an unencrypted version of the first encrypted request, the unencrypted version associated with authentication information 212 associated with client 102A. In block 506, content streamer 116 sends over a second encrypted connection 216 entitlement data 214 and a second encrypted request 218 for the content 124 to repository 120. Repository 120 stores content 124, and entitlement data 124 is based on authentication information 212 included in authenticated request 208. An authentication of second encrypted request 218 is based on entitlement data 214, and second encrypted request 218 is based on the encrypted request 122A. In block 508, content streamer 116 downloads content 124 from repository 120 over second encrypted connection 216. In block 510, caching proxy stores requested content 124 in unencrypted form in a cache. In block 512, data synchronization system 110 streams requested content 124 to client 102A.

In some examples, one or more actions illustrated in blocks 502-512 may be performed for any number of requests for content received by reverse proxy 112. Additionally, it is also understood that additional processes may be inserted before, during, or after blocks 502-512 discussed above. It is also understood that one or more of the blocks of method 500 described herein may be omitted, combined, or performed in a different sequence as desired.

V. Example System Diagram

Figure 6:
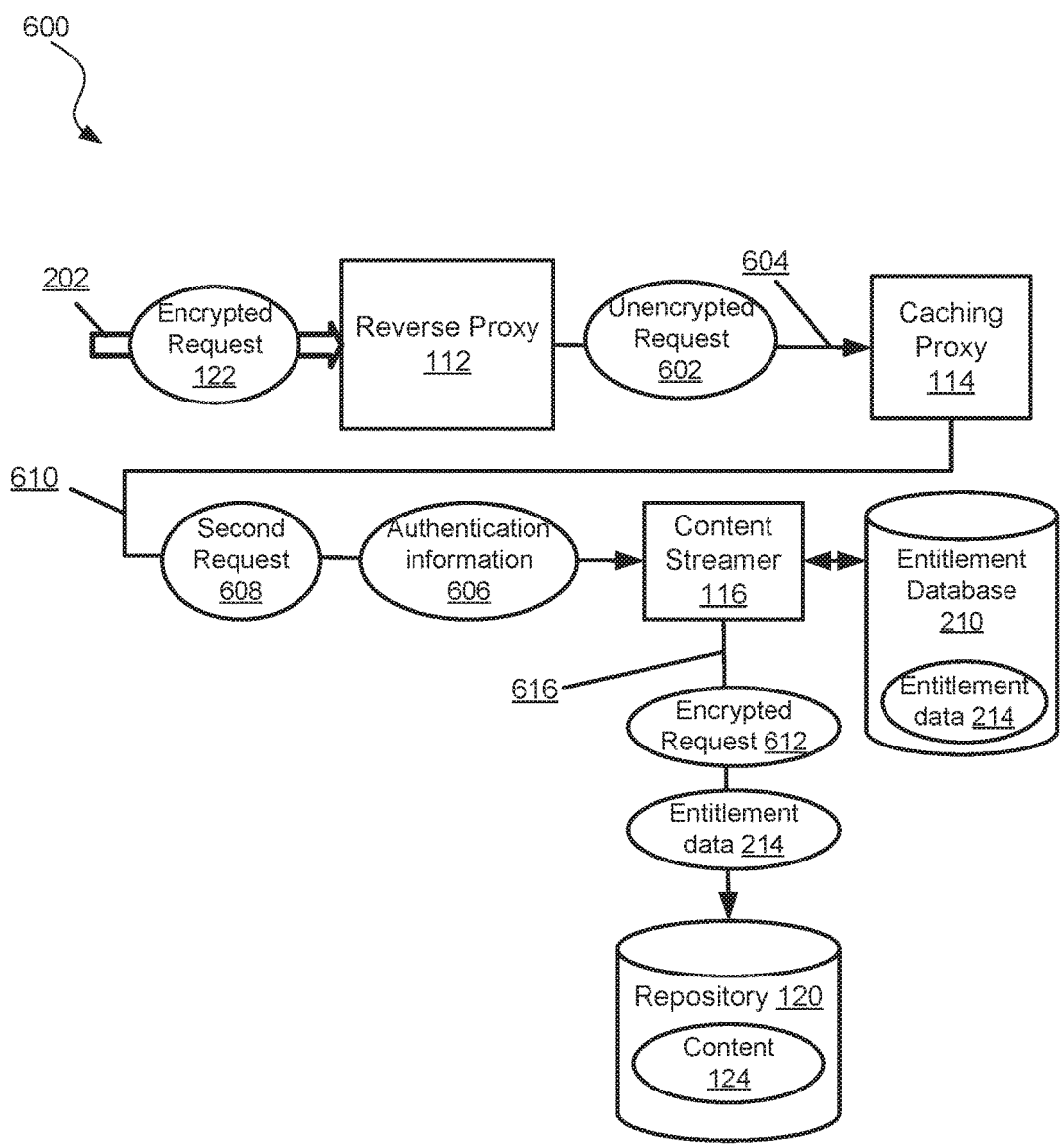
FIG. 6 is an example system diagram for distributing content received over an encrypted connection to one or more clients.

FIG. 6 is an example system diagram 600 for distributing content received over an encrypted connection to one or more clients. In FIG. 6, reverse proxy 112 authenticates one or more encrypted requests 122 received from one or more clients over one or more encrypted connections 202. Reverse proxy 112 unencrypts one or more authenticated encrypted requests 122 and sends the one or more unencrypted requests 602 over a connection 604 different from the one or more encrypted connections 202. In an example, reverse proxy 112 unencrypts encrypted request 122 to generate unencrypted request 602.

Caching proxy 114 receives unencrypted request 602 for content 124 over connection 604 and sends authentication information 606 and a second request 608 for content 124 over a second connection 610 different from the one or more encrypted connections 202. Authentication information 606 is specific to the client that sent encrypted request 122.

Content streamer 116 receives authentication information 606 and second request 608 over second connection 610, and retrieves, based on authentication information 606, entitlement data 214 from entitlement database 210. Content streamer 116 sends entitlement data 214 and an encrypted request 612 for content 124 over encrypted connection 616 to repository 120 storing content 124. Encrypted request 612 is based on second request 608, and they both are requests for content 124. An authentication of encrypted request 612 is based on entitlement data 214. Content streamer 116 downloads content 124 from repository 120 over encrypted connection 616 if encrypted request 612 is authenticated. Additionally, if encrypted request 612 is authenticated, caching proxy 114 caches requested content 124 in unencrypted form and streams requested content 124 to reverse proxy 112, which streams content 124 to the client that requested content 124.

VI. Distribution of Cached Content

Figure 7:
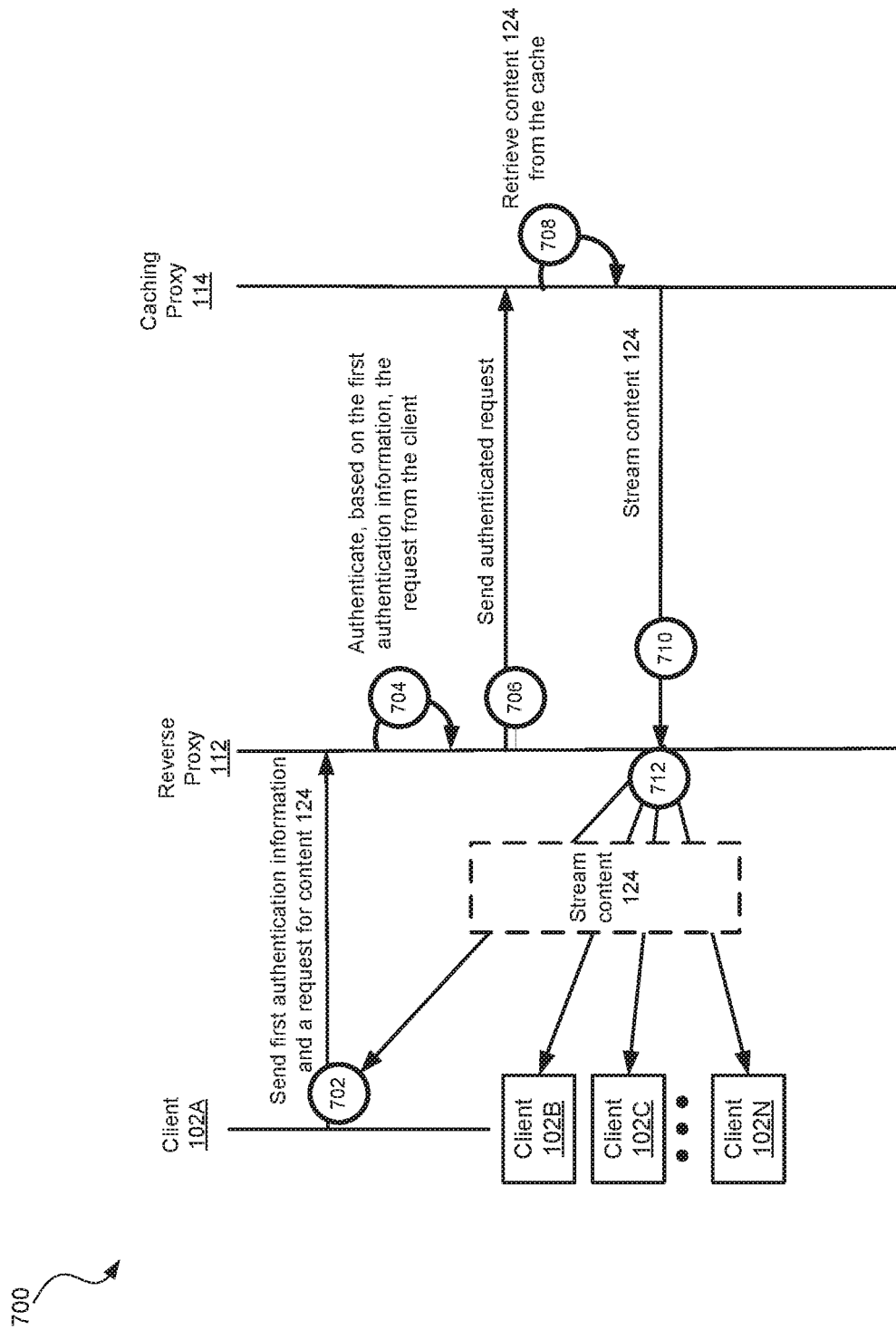
FIG. 7 is an example sequence diagram for distributing cached content.

FIG. 7 is an example sequence diagram 700 for distributing cached content. Diagram 700 is not meant to be limiting and may be used in other applications. In FIG. 7, at action 702, client 102 sends first authentication information and a request for content 124 to reverse proxy 112. A plurality of clients may send authentication information and a request for content (e.g., content 124 or other content) to reverse proxy 112. At action 704, reverse proxy 112 authenticates, based on the first authentication information, the request from the client. At action 706, reverse proxy 112 sends the authenticated request to caching proxy 114.

At action 708, caching proxy 114 may determine that the authenticated request is stored in the cache and may retrieve a result of the authenticated request. In an example, the authenticated request was previously satisfied and its result stored in the cache. In the example illustrated in FIG. 7, caching proxy 114 retrieves content 124 from the cache, where content 124 satisfies the authenticated request. At action 710, caching proxy 114 streams content 124 to reverse proxy 112. Action 712, reverse proxy 112 streams content 124 to one or more clients (e.g., client 102A, 102B, 102C, . . . , 102N) that have requested content 124. Reverse proxy 112 may stream content 124 to multiple clients by multiplexing content 124 and streaming it to the authenticated clients. In an example, reverse proxy 112 streams content 124 to the clients over an encrypted connection. In this example, rather than send the authenticated request including authentication information (see action 408 in FIG.

4) to content streamer 116 for retrieval of content 124, caching proxy 114 may retrieve this content from the cache. In this example, actions 402-418 occurred before actions 702-712.

As discussed above and further emphasized here, FIGS. 1-7 are merely examples, which should not unduly limit the scope of the claims. For example, system 100 may include additional devices (e.g., servers, applications, clients, systems, gateways, repositories, and/or processors) than those illustrated in FIG. 1 and/or may include more than one network, devices, and/or systems. Additionally, client 102, web server 104, data synchronization system 110, and/or repository 120 may be implemented by hardware, software, firmware and/or any combination thereof.

A computer system is suitable for implementing one or more examples of the present disclosure. In various implementations, the computer system may include a client or a server computing device. The client or server computing device may include a plurality of processors. The client or server computing device may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

The example computer system may include a bus or other communication mechanism for communicating information data, signals, and information between various components of the computer system. Additionally, the computer system includes an input/output (I/O) component that processes a user action, such as selecting keys from a keypad/keyboard, selecting one or more buttons or links, etc., and sends a corresponding signal to the bus. The I/O component may also include an output component such as a display, and an input control such as a cursor control (e.g., a keyboard, keypad, mouse, etc.).

A transceiver or network interface transmits and receives signals between the computer system and other devices via a communications link to a network. In an example, the transmission is wireless, although other transmission mediums and methods may also be suitable. The processor, which may be a micro-controller, digital signal processor (DSP), or other processing component, processes these various signals, such as for display on the computer system or transmission to other devices via a communications link. The processor may also control transmission of information, such as cookies or IP addresses, to other devices.

Components of the computer system also include a system memory component (e.g., RAM), a static storage component (e.g., ROM), and/or a computer readable medium (e.g., disk drive). The computer system performs specific operations by the processor and other components by executing one or more sequences of instructions contained in the system memory component. Logic may be encoded in a computer readable medium, which may refer to any medium that participates in providing instructions to the processor for execution. Such a medium may take many forms, including but not limited to, non-volatile media, volatile media, and transmission media.

In various implementations, non-volatile media includes optical, or magnetic disks, or solid-state drives, volatile media includes dynamic memory, such as the system memory component, and transmission media includes coaxial cables, copper wire, and fiber optics, including wires that include the bus. In an example, the logic is encoded in non-transitory computer readable medium. In an example, transmission media may take the form of acoustic or light waves, such as those generated during radio wave, optical, and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various examples, execution of instruction sequences (e.g., method 300 and/or method 500) to practice the present disclosure may be performed by the computer system. In various other examples, a plurality of the computer systems coupled by a communication links to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps, blocks, or actions described herein may be changed, combined into composite steps, blocks, or composite actions, and/or separated into sub-steps, sub-blocks, or sub-actions to provide features described herein.

In the foregoing description, numerous details are set forth. It will be apparent, however, to one of ordinary skill in the art having the benefit of this disclosure, that the present disclosure may be practiced without these specific details. In some examples, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the disclosure should be limited only by the following claims, and it is appropriate that the claims be construed broadly and in a manner consistent with the scope of the examples disclosed herein.

What is claimed is:

1. A method for distributing content received over an encrypted connection to one or more clients, comprising:
  receiving, by a proxy from a client, a first encrypted request for content over a first encrypted connection;
  obtaining, by the proxy, an unencrypted version of the first encrypted request, the unencrypted version associated with authentication information being associated with the client;
  sending, by a content streamer, over a second encrypted connection entitlement data and a second encrypted request for the content to a repository, the repository storing the content, the entitlement data being based on the authentication information, an authentication of the second encrypted request being based on the entitlement data, and the second encrypted request being based on the first encrypted request;
  downloading by the content streamer the content from the repository over the second encrypted connection if the second encrypted request is authenticated;
  storing by the proxy the requested content in unencrypted form in a cache; and
  streaming by the proxy the requested content to the client.

2. The method of claim 1, wherein the first encrypted request includes second authentication information associated with the client, the method further comprising:
  authenticating, by a reverse proxy, the first encrypted request in accordance with the second authentication information;
  if the first encrypted request is not successfully authenticated, discarding, by the reverse proxy, the first encrypted request; and
  if the first encrypted request is successfully authenticated:
    unencrypting, by the reverse proxy, the first encrypted request to generate the unencrypted version of the first encrypted request;
    establishing, by the reverse proxy, a connection with a caching proxy, the connection being different from the first encrypted connection; and
    sending, by the reverse proxy, the unencrypted version of the first encrypted request to the caching proxy over the connection.

3. The method of claim 2, further comprising:
  storing, by the caching proxy, the unencrypted version of the first encrypted request in the cache.

4. The method of claim 3, further comprising:
  receiving, at the caching proxy, a second unencrypted version of a third encrypted request for second content, the second unencrypted version being from the reverse proxy;
  determining whether the second unencrypted version is stored in the cache; and
  in response to a determination that the second unencrypted version is stored in the cache, retrieving, by the caching proxy, the second content from the cache and streaming the second content to a second client that sent the third encrypted request.

5. The method of claim 4, further comprising:
  determining whether the second unencrypted version is stored in an in-process queue; and in response to a determination that the second unencrypted version is stored in the in-process queue, multiplexing an existing stream of bytes of the second content to a plurality of clients that sent a request for the second content, wherein the first content is the second content.

6. The method of claim 5, wherein obtaining the unencrypted version of the first encrypted request, sending the entitlement data and the second encrypted request, downloading the content, storing the requested content, and streaming the requested content includes in response to a determination that the second unencrypted version is not stored in the cache and in response to a determination that the second unencrypted version is not in the in-process queue, obtaining the unencrypted version of the first encrypted request, sending the entitlement data and the second encrypted request, downloading the content, storing the requested content, and streaming the requested content.

7. The method of claim 2, wherein the first authentication information is different from the second authentication information.

8. The method of claim 2, wherein the first authentication information is the same as the second authentication information.

9. The method of claim 1, further comprising:
terminating the first encrypted connection with the client.

10. The method of claim 1, further comprising:
retrieving, based on the authentication information, the entitlement data from an entitlement database.

11. The method of claim 1, further comprising:
if the second encrypted request is not successfully authenticated, discarding the second encrypted request; and
if the second encrypted request is successfully authenticated, establishing the second encrypted connection with the repository.

12. A system for distributing content received over an encrypted connection to one or more clients, comprising:
a reverse proxy that authenticates one or more encrypted requests received from one or more clients over one or more encrypted connections, unencrypts one or more authenticated encrypted requests, and sends the one or more unencrypted requests over a first connection different from the one or more encrypted connections; and
a caching proxy that receives an unencrypted request for content over the first connection and sends authentication information and a second request for the content over a second connection different from the one or more encrypted connections; and
a content streamer that receives the authentication information and the second request over the second connection, retrieves, based on the authentication information, entitlement data from an entitlement database, and sends the entitlement data and an encrypted request for the content over an encrypted connection to a repository storing the content, wherein an authentication of the encrypted request is based on the entitlement data, and wherein the content streamer downloads the content from the repository over the encrypted connection if the encrypted request is authenticated, the caching proxy receives the requested content, caches the requested content in unencrypted form, and streams the requested content to the reverse proxy, and the reverse proxy streams the content to the client.

13. The system of claim 12, wherein the second encrypted connection is a Transport Layer Security (TLS) connection.

14. The system of claim 13, wherein the authentication information includes a TLS certificate.

15. The system of claim 12, wherein the authentication information includes a username and password.

16. The system of claim 12, wherein the caching proxy receives a plurality of authenticated requests for the content and deduplicates the plurality of authenticated requests by sending a single request for the content to the content streamer for processing.

17. The system of claim 12, wherein during a period of time, the content streamer downloads the content and streams the content to caching proxy, the caching proxy receives the streamed content from the content streamer and streams the content to the reverse proxy, and the reverse proxy receives the streamed content from the caching proxy and streams the content to the client.

18. The system of claim 12, wherein the caching proxy caches the unencrypted version of the first encrypted request.

19. The system of claim 18, wherein the caching proxy receives a second unencrypted version of a third encrypted request for the content from the reverse proxy and determines whether the second unencrypted version is cached at the caching proxy, wherein in response to a determination that the second unencrypted version is cached at the caching proxy, the caching proxy retrieves the content and streams the content to a second client that sent the third encrypted request.

20. A non-transitory machine-readable storage medium comprising a plurality of machine-readable instructions that when executed by one or more hardware processors is configurable to cause the one or more hardware processors to perform a method comprising:
receiving, by a proxy from a client, a first encrypted request for content over a first encrypted connection;
obtaining by the proxy an unencrypted version of the first encrypted request, the unencrypted version associated with authentication information being associated with the client;
sending by a content streamer over a second encrypted connection entitlement data and a second encrypted request for the content to a repository, the repository storing the content, the entitlement data being based on the authentication information, an authentication of the second encrypted request being based on the entitlement data, and the second encrypted request being based on the first encrypted request;
downloading by the content streamer the content from the repository over the second encrypted connection if the second encrypted request is authenticated;
storing by the proxy the requested content in unencrypted form in a cache; and
streaming by the proxy the requested content to the client.

* * * * *